US010649242B2

(12) United States Patent
Iwasaki

(10) Patent No.: US 10,649,242 B2
(45) Date of Patent: May 12, 2020

(54) MULTILAYER FILM, MULTILAYER FILM COMPOSITE, OPTICAL COMPONENT, AND WINDOW

(71) Applicant: Koji Iwasaki, Kanagawa (JP)

(72) Inventor: Koji Iwasaki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 54 days.

(21) Appl. No.: 15/878,472

(22) Filed: Jan. 24, 2018

(65) Prior Publication Data

US 2018/0275433 A1 Sep. 27, 2018

(30) Foreign Application Priority Data

Mar. 21, 2017 (JP) ................. 2017-054793

(51) Int. Cl.
*G02B 5/20* (2006.01)
*G02F 1/01* (2006.01)
(Continued)

(52) U.S. Cl.
CPC ............... *G02F 1/0147* (2013.01); *B32B 7/02* (2013.01); *E06B 3/67* (2013.01); *E06B 9/24* (2013.01); *G02B 5/208* (2013.01); *G02B 5/26* (2013.01); *G02B 5/282* (2013.01); *B32B 2307/418* (2013.01); *B32B 2309/105* (2013.01); *B60J 1/001* (2013.01); *B60J 3/007* (2013.01);
(Continued)

(58) Field of Classification Search
CPC .......... G02B 5/208; G02B 5/26; G02B 5/282; G02B 5/20; G02F 1/01; G02F 1/0147; G02F 2203/02; B32B 7/02; B32B 2307/418; B32B 2309/105; E06B 3/67; E06B 9/24; E06B 1/526; E06B 3/6715; E06B 2003/346; E06B 2009/2417; B60J 1/001; B60J 3/007
USPC ............... 359/359, 350, 589, 586, 584, 885; 428/411.1, 412, 480
See application file for complete search history.

(56) References Cited

U.S. PATENT DOCUMENTS 6,310,725 B1 * 10/2001 Duine ...................... G02F 1/19
                                                        359/585
6,391,400 B1 * 5/2002 Russell ................... B32B 17/10
                                                        296/84.1
2014/0092468 A1 * 4/2014 Takamuki .............. G02B 5/206
                                                        359/359

FOREIGN PATENT DOCUMENTS

JP      2003-335553     11/2003
JP      2016-210955     12/2016
WO      WO2017/047585 A1   3/2017

OTHER PUBLICATIONS

J. N. Huiberts, R. Griessen, J. H. Rector, R. J. Wijngaarden, J. P. Dekker, D. G. de Groot, N. J. Koeman, Nature, 380, 231 (1996), pp. 231-234.

(Continued)

*Primary Examiner* — Jie Lei
(74) *Attorney, Agent, or Firm* — Oblon, McClelland, Maier & Neustadt, L.L.P.

(57) ABSTRACT

To provide a multilayer film, wherein a reflectance of the multilayer film in a visible light region and a reflectance of the multilayer film in a near infrared region are both 0.1% or more but 20% or less in a temperature range of 5° C. or more but less than 30° C., and the reflectance of the multilayer film in the visible light region is 0.1% or more but 20% or less and the reflectance of the multilayer film in the (Continued)

near infrared region is 80% or more but less than 100% in a temperature range of 30° C. or more but less than 60° C.

9 Claims, 2 Drawing Sheets

(51) Int. Cl.
| | |
|---|---|
| *G02B 5/26* | (2006.01) |
| *E06B 9/24* | (2006.01) |
| *B32B 7/02* | (2019.01) |
| *E06B 3/67* | (2006.01) |
| *G02B 5/28* | (2006.01) |
| *B60J 1/00* | (2006.01) |
| *B60J 3/00* | (2006.01) |
| *E06B 3/34* | (2006.01) |
| *E06B 1/52* | (2006.01) |

(52) U.S. Cl.
CPC ............. *E06B 1/526* (2013.01); *E06B 3/6715* (2013.01); *E06B 2003/346* (2013.01); *E06B 2009/2417* (2013.01); *G02F 2203/02* (2013.01)

(56) References Cited

OTHER PUBLICATIONS

T. J. Richardson, J. L. Slack, R. D. Armitage, R. Kostecki, B. Farangis, and M. D. Rubin. Applied Physics Letters. 78, 3047 (2001), pp. 3047-3049.

* cited by examiner

MULTILAYER FILM, MULTILAYER FILM COMPOSITE, OPTICAL COMPONENT, AND WINDOW

CROSS-REFERENCE TO RELATED APPLICATIONS

The present application claims priority under 35 U.S.C. § 119 to Japanese Patent Application No. 2017-054793 filed Mar. 21, 2017. The contents of which are incorporated herein by reference in their entirety.

BACKGROUND OF THE INVENTION

Field of the Invention

The present disclosure relates to a multilayer film, a multilayer film composite, an optical component, and a window.

Description of the Related Art

Generally, a window in a building is where a large quantity of heat enters and exits. For example, a ratio at which heat upon heating in winter flows out through a window reaches about 48% and a ratio at which heat enters from a window upon cooling in summer reaches as much as about 71%.

The aforementioned phenomenon observed in the window glass of the building is also applicable to an automobile having a window glass through which a large quantity of heat enters and exits. A ratio of the window glass to space in the automobile is higher than a ratio of the window glass to space in the building. Moreover, a driver in the automobile experiences a considerably high temperature under blazing sun because there is less space to avoid solar radiation. For example, in the measurement case in summer in Japan, an air temperature in the automobile upon parking reaches about 70° C. Furthermore, regarding a temperature of interior materials in the automobile, a temperature of the upper surface of the instrument panel reaches about 100° C. and a temperature of the ceiling reaches about 70° C. Under such a circumstance, it goes without saying that a driver will feel uncomfortable when he/she rides in the automobile. Even upon ventilation or use of a cooling apparatus, the temperature of the interior materials is not easily lowered and a driver continues to experience radiated radiant heat over a long period, resulting in considerably low comfortability in the automobile.

As technique for solving these problems, use of reflection-type light modulating materials, which have a property of reversibly changing between a mirror state and a transparent state, has been considered.

For example, it has been reported that hydrides of the rare earth elements such as yttrium and lanthanum can reversibly change between a mirror state and a transparent state by occluding and releasing protons (see, for example, J. N. Huiberts, R. Griessen, J. H. Rector, R. J. Wijngaarden, J. P. Dekker, D. G. de Groot, N. J. Koeman, Nature, 380, 231 (1996)).

Moreover, $Mg_2Ni$ and $MgNi_x$ ($0.1<x<0.3$), which are magnesium•nickel alloys, have been proposed as the reflection-type light modulating materials (see, for example, Japanese Unexamined Patent Application Publication No. 2003-335553 and T. J. Richardson, J. L. Slack, R. D. Armitage, R. Kostecki, B. Farangis, and M. D. Rubin, Applied Physics Letters. 78, 3047 (2001)).

SUMMARY OF THE INVENTION

According to one aspect of the present disclosure, a multilayer film is provided, wherein a reflectance of the multilayer film in a visible light region and a reflectance of the multilayer film in a near infrared region are both 0.1% or more but 20% or less in a temperature range of 5° C. or more but less than 30° C., and the reflectance of the multilayer film in the visible light region is 0.1% or more but 20% or less and the reflectance of the multilayer film in the near infrared region is 80% or more but less than 100% in a temperature range of 30° C. or more but less than 60° C.

DESCRIPTION OF THE EMBODIMENTS (Multilayer Film)

Figure 1:
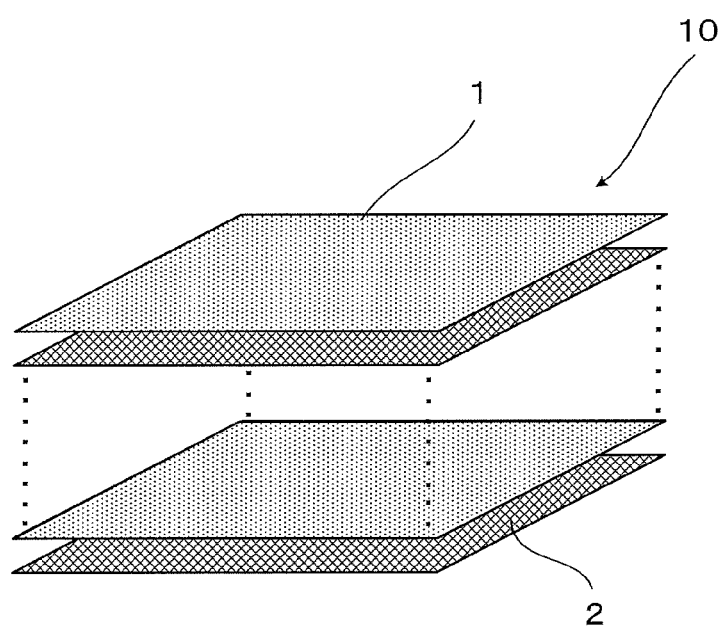
FIG. 1 is a schematic view presenting one example of a multilayer film of the present disclosure.

The present disclosure provides a multilayer film. A reflectance of the multilayer film in a visible light region and a reflectance of the multilayer film in a near infrared region are 0.1% or more but 20% or less in a temperature range of 5° C. or more but less than 30° C., and the reflectance of the multilayer film in the visible light region is 0.1% or more but 20% or less and the reflectance of the multilayer film in the near infrared region is 80% or more but less than 100% in a temperature range of 30° C. or more but less than 60° C.

The multilayer film of the present disclosure is based on the finding that conventional hydrides of the rare earth elements (e.g., yttrium and lanthanum) and conventional reflection-type light modulating materials (e.g., $Mg_2Ni$ and $MgNi_x$ ($0.1<x<0.3$), which are magnesium•nickel alloys) absorb and reflect not only light in the near infrared region but also light in the visible light region, resulting in deterioration of visibility.

The present disclosure has an object to provide a multilayer film capable of controlling a property of insulating heat based on an outside temperature environment without deteriorating visibility.

According to the present disclosure, it is possible to provide a multilayer film capable of controlling a property of insulating heat based on an outside temperature environment without deteriorating visibility.

Regarding the multilayer film, a reflectance of the multilayer film in a visible light region and a reflectance of the multilayer film in a near infrared region are 0.1% or more but 20% or less, preferably 0.1% or more but 10% or less, in a temperature range of 5° C. or more but less than 30° C. This makes it possible to raise temperature in a room because the multilayer film does not reflect visible light and near infrared rays under a winter environment (5° C. or more but less than 30° C.).

Regarding the multilayer film, the reflectance of the multilayer film in the visible light region is 0.1% or more but 20% or less and the reflectance of the multilayer film in the near infrared region is 80% or more but less than 100% in a temperature range of 30° C. or more but less than 60° C. It is preferable that the reflectance of the multilayer film in the visible light region be 0.1% or more but 20% or less and the reflectance of the multilayer film in the near infrared region be 90% or more but less than 100% in a temperature range of 30° C. or more but less than 60° C. This makes it possible to prevent a rise in temperature in a room because the multilayer film does not reflect visible light but reflects near infrared rays under a summer environment (30° C. or more but less than 60° C.).

The reflectance can be measured with, for example, a spectrophotometer (device name: MPC-3100, available from SHIMADZU CORPORATION).

The temperature range of 5° C. or more but less than 30° C. means, for example, a temperature range under a winter environment.

The temperature range of 30° C. or more but less than 60° C. means, for example, a temperature range under a summer environment.

The visible light region means a wavelength region of 400 nm or more but less than 800 nm.

The near infrared region means a wavelength region of 800 nm or more but less than 1,200 nm.

The multilayer film includes one or more first layers and one or more second layers.

The one or more first layers preferably have an average thickness of 50 nm or more but 300 nm or less, more preferably an average thickness of 100 nm or more but 250 nm or less.

The one or more second layers preferably have an average thickness of 50 nm or more but 200 nm or less, more preferably have an average thickness of 100 nm or more but 200 nm or less.

When the one or more first layers and the one or more second layers have an average thickness falling within the preferable numerical ranges, wavelength selectivity of reflected light can be excellent to achieve a desirable reflectance.

When the one or more first layers and the one or more second layers each have a given thickness, only a certain wavelength can be reflected. As a result, an average reflectance cannot be increased in an even manner over a broad wavelength band of 800 nm or more but 1,200 nm or less. That is, in the one or more first layers and the one or more second layers constituting the multilayer film, a refractive index of the first layer is decreased as heat energy is applied, while a refractive index of the second layer is increased due to heat energy, resulting in generation of a difference between the refractive indices in a certain temperature range. In addition, when the one or more first layers and the one or more second layers satisfy a certain range of the average thickness and a certain range of the total number of laminated layers, the reflectance in the near infrared region can be controlled with the reflectance in the visible light region being maintained.

The average thickness of each layer can be measured, for example, based on a photo taken with a transmission electron microscope.

In the multilayer film, a ratio of the average thickness of each of the second layers to the average thickness of each of the first layers is preferably 1.5 times or more but 5.0 times or less. A lower limit of the ratio of the average thickness of each of the second layers to the average thickness of each of the first layers is more preferably 2.0 times. An upper limit of the ratio of the average thickness of each of the second layers to the average thickness of each of the first layers is preferably 4.0 times, more preferably 3.5 times.

When the ratio of the average thickness of each of the second layers to the average thickness of each of the first layers falls within the numerical range, a secondary reflection generated at the half wavelength of a reflection wavelength can be effectively used. Therefore, a ratio between the maximum thickness and the minimum thickness in each of the first layer and the second layer can be limited to a minimum, which is preferable in terms of optical properties. As describe above, by changing the ratio of the average thickness of each of the second layers to the average thickness of each of the first layers, the following effects can be achieved. Specifically, it is possible to adjust a mechanical property of the obtained multilayer film with adherence between layers be maintained and without changing the materials to be used. In addition, the multilayer film is hardly split. On the other hand, when the ratio of the average thickness of each of the second layers to the average thickness of each of the first layers is out of the numerical range, the secondary reflection generated at the half wavelength of a reflection wavelength will be small, which may lower the reflectance.

The multilayer film includes two or more kinds of alternately laminated bodies, each of which includes the one or more first layers and the one or more second layers. In addition, it is preferable that the number of the one or more first layers constituting each of the plurality kinds of alternately laminated bodies be 50 layers or more and the number of the one or more second layers constituting each of the plurality kinds of alternately laminated bodies be 50 layers or more. Regarding the one or more first layers and the one or more second layers, by changing the average thickness and the number of laminated layers, it is possible to reflect light having a broader wavelength region.

The number of the one or more first layers and the number of the one or more second layers are each more preferably 100 layers or more but 300 layers or less, still more preferably 200 layers or more but 300 layers or less. An upper limit of the number of laminated layers is 2,000 layers.

When the number of laminated layers falls within the preferable numerical range, a desirable reflectance in the near infrared region can be obtained.

Either the number of the one or more first layers or the number of the one or more second layers is less than 50 layers, a desired reflectance in the near infrared region may not be obtained. When the number of laminated layers is more than 2,000 layers, a manufacturing cost will be considerably high, which is not practical.

The multilayer film preferably includes two or more kinds of alternately laminated bodies, more preferably includes 2 or more but 4 or less kinds of alternately laminated bodies, still more preferably includes four kinds of the alternately laminated bodies, where each of the alternately laminated bodies includes the one or more first layers and the one or more second layers. When 2 or more but 4 or less kinds of alternately laminated bodies are included, it is possible to ensure a favorable visibility and obtain a function of autonomy adjustment of near infrared rays.

The multilayer film including only one alternately laminated body may not ensure a desirable visibility and may not obtain a function of autonomy adjustment of near infrared rays, and the multilayer film including 5 kinds or more alternately laminated bodies complicates a step of processing multilayers, which is not preferable.

Here, the one or more first layers and the one or more second layers of the multilayer film including four alternately laminated bodies A to D each preferably have an average thickness and the number of laminated layers as presented in the following Table A, more preferably have an average thickness and the number of laminated layers as presented in the following Table B.

TABLE A

| Configuration of multilayer film | | Alternately laminated body A | Alternately laminated body B | Alternately laminated body C | Alternately laminated body D |
|---|---|---|---|---|---|
| First layers | Average thickness | 100 nm or more but 200 nm or less | 100 nm or more but 200 nm or less | 100 nm or more but 200 nm or less | 100 nm or more but 200 nm or less |
| | Number of first layers | 50 layers or more but 300 layers or less | 50 layers or more but 300 layers or less | 50 layers or more but 300 layers or less | 50 layers or more but 300 layers or less |
| Second layers | Average thickness | 100 nm or more but 200 nm or less | 100 nm or more but 200 nm or less | 100 nm or more but 200 nm or less | 100 nm or more but 200 nm or less |
| | Number of second layers | 50 layers or more but 300 layers or less | 50 layers or more but 300 layers or less | 50 layers or more but 300 layers or less | 50 layers or more but 300 layers or less |

TABLE B

| Configuration of multilayer film | | Alternately laminated body A | Alternately laminated body B | Alternately laminated body C | Alternately laminated body D |
|---|---|---|---|---|---|
| First layers | Average thickness | 150 nm or more but 200 nm or less | 150 nm or more but 200 nm or less | 150 nm or more but 200 nm or less | 150 nm or more but 200 nm or less |
| | Number of first layers | 100 layers or more but 300 layers or less | 100 layers or more but 300 layers or less | 100 layers or more but 300 layers or less | 100 layers or more but 300 layers or less |
| Second layers | Average thickness | 100 nm or more but 150 nm or less | 115 nm or more but 165 nm or less | 130 nm or more but 180 nm or less | 145 nm or more but 195 nm or less |
| | Number of second layers | 100 layers or more but 300 layers or less | 100 layers or more but 300 layers or less | 100 layers or more but 300 layers or less | 100 layers or more but 300 layers or less |

The multilayer film includes one or more first layers and one or more second layers.

The multilayer film preferably satisfies Expression 1 below:

$$-0.010 \leq (R_B - R_A) \leq 0.010$$

$$0.010 \leq (R_D - R_C) \leq 0.20 \quad \text{[Expression 1]}$$

where the $R_A$ is a minimum refractive index of a material constituting the one or more first layers at 5° C. or more but less than 30° C., the $R_B$ is a minimum refractive index of a material constituting the one or more second layers at 5° C. or more but less than 30° C., the $R_C$ is a maximum refractive index of the material constituting the one or more first layers at 30° C. or more but less than 60° C., and the $R_D$ is a maximum refractive index of the material constituting the one or more second layers at 30° C. or more but less than 60° C. When a relationship of the Expression 1 is satisfied, a reflectance of near infrared rays under a summer environment (30° C. or more but less than 60° C.) will be high and a reflectance of near infrared rays under a winter environment (5° C. or more but less than 30° C.) will be low, which is preferable.

The multilayer film more preferably satisfies Expression 2 below, still more preferably satisfies Expression 3 below. When these relationships are satisfied, a reflectance of near infrared rays under a summer environment (30° C. or more but less than 60° C.) will be higher and a reflectance of near infrared rays under a winter environment (5° C. or more but less than 30° C.) will be lower, which is more preferable.

$$-0.005 \leq (R_B - R_A) \leq 0.005$$

$$0.05 \leq (R_D - R_C) \leq 0.20 \quad \text{[Expression 2]}$$

$$-0.002 \leq (R_B - R_A) \leq 0.002$$

$$0.09 \leq (R_D - R_C) \leq 0.20 \quad \text{[Expression 3]}$$

On the other hand, the multilayer film satisfying a relationship of Expression 4 below is not preferable because near infrared rays are reflected even under a winter environment (5° C. or more but less than 30° C.). The multilayer film satisfying a relationship of Expression 5 is not preferable because the total number of laminated layers is increased to deteriorate manufacturability. The multilayer film satisfying a relationship of Expression 6 cannot be practically produced.

$$(R_B - R_A) < -0.010 \text{ or } (R_B - R_A) > 0.010 \quad \text{[Expression 4]}$$

$$(R_D - R_C) < 0.010 \quad \text{[Expression 5]}$$

$$(R_D - R_C) > 0.20 \quad \text{[Expression 6]}$$

The minimum refractive index $R_A$ of a material constituting the one or more first layers at 5° C. or more but less than 30° C., the minimum refractive index $R_B$ of a material constituting the one or more second layers at 5° C. or more but less than 30° C., the maximum refractive index $R_C$ of a material constituting the one or more first layers at 30° C. or more but less than 60° C., and the maximum refractive index $R_D$ of a material constituting the one or more second layers at 30° C. or more but less than 60° C. can be measured as described below.

An Abbe refractometer (DR-M2, available from ATAGO CO., LTD.) is used to measure all of the aforementioned refractive indices. A certain amount of the material constituting the one or more first layers and a certain amount of the material constituting the one or more second layers are each dissolved in a solvent (e.g., ethanol) to form a coating liquid. Then, the coating liquid is cast on a measurement part of the Abbe refractometer and is dried.

Each of the $R_A$ and the $R_B$ is the minimum value among refractive indices measured at set temperatures of 5° C., 10° C., 15° C., 20° C., 25° C., and 29° C. with a measurement wavelength of the Abbe refractometer being set to 589 nm.

Each of the $R_C$ and the $R_D$ is the maximum value among refractive indices measured at set temperatures of 30° C., 35° C., 40° C., 45° C., 50° C., 55° C., and 59° C. with a measurement wavelength of the Abbe refractometer being set to 589 nm.

—First Layer—

As the material constituting the one or more first layers, the minimum refractive index $R_A$ of the material constituting the one or more first layers in a temperature range of 5° C. or more but less than 30° C. and the minimum refractive index $R_B$ of the material constituting the one or more second layers in a temperature range of 5° C. or more but less than 30° C. preferably satisfy a relationship of the Expression 1. The reason for this is described below. Specifically, a typical material (e.g., thermoplastic resin) is reduced in its refractive index as the temperature rises. Therefore, a relationship between the maximum refractive index $R_c$ of the material constituting the one or more first layers in a temperature range of 30° C. or more but less than 60° C. and the maximum refractive index $R_D$ of the material constituting the one or more second layers in a temperature range of 30° C. or more but less than 60° C. is determined based on properties of the one or more second layers.

The material constituting the one or more first layers is not particularly limited and may be appropriately selected depending on the intended purpose, but is preferably a thermoplastic resin.

Examples of the thermoplastic resin constituting the one or more first layers include polyethylene, polypropylene, polyvinyl acetate, polystyrene, polyacrylic acid, polyacrylic ester, polymethacrylic acid, polymethyl methacrylate (PMMA), polyacrylonitrile, polybutadiene, polyamide, polyacetal, polycarbonate, polyphenylene ether, polyethylene terephthalate, polybutylene terephthalate, cyclic polyolefin, polyphenylene sulfide, polytetrafluoroethylene, polysulphone, polyethersulfone, polyarylate, liquid crystal polymers, polyimide, derivatives thereof, copolymers thereof, and alloys thereof. These may be used alone or in combination. Among them, poly(meth)acrylic ester and derivatives thereof are preferable in terms of processability of the film.

As the material constituting the one or more first layers, the material constituting the one or more first layers can be used alone or a composition for the one or more first layers, which includes the material constituting the one or more first layers, can also be used.

It is possible to add, to the composition for the one or more first layers, an additive such as an inorganic material (e.g., soda glass and quartz glass), an antioxidant or a thermal degradation inhibitor, a plasticizer, inorganic fillers, inorganic fine particles, a pigment, and a dye.

—Second Layer—

Preferably, the material constituting the one or more second layers is a polymer which has a temperature-responsive unit in a molecule thereof and in which the minimum refractive index $R_A$ of the material constituting the one or more first layers in a temperature range of 5° C. or more but less than 30° C., the minimum refractive index $R_B$ of the material constituting the one or more second layers in a temperature range of 5° C. or more but less than 30° C., the maximum refractive index $R_C$ of the material constituting the one or more first layers in a temperature range of 30° C. or more but less than 60° C., and the maximum refractive index $R_D$ of the material constituting the one or more second layers in a temperature range of 30° C. or more but less than 60° C. satisfy the Expression 1.

The polymer constituting the one or more second layers preferably includes the temperature-responsive unit that changes at least one of a molecular structure and a structure of the polymer chain according to a temperature. Incorporation of the temperature-responsive unit makes it possible to express a function of changing, for example, a refractive index (i.e., optically switching function) in response to a temperature.

Examples of the temperature-responsive unit include: a unit changing its structure through isomerization with heat (e.g., azobenzene and diarylethene); a hydrogen-bonding unit (e.g., hydroxyl group, carbonyl bond, and amide bond), and combinations thereof. Among them, a hydrogen-bonding unit is more preferable, an amide bond where a hydrogen bonding strength between hydrogen-bonding units starts to decrease at a temperature of about 40° C. is more preferable because repetitive durability to the optically switching function is excellent.

The temperature-responsive unit is not particularly limited and may be appropriately selected depending on the intended purpose. For example, the temperature-responsive unit can be introduced into a straight chain of a polymer or can be introduced into a branched chain of a branched polymer (e.g., star polymer and hyperbranched polymer). Among them, introduction into a branched chain of a branched polymer is preferable in terms of thermoresponsive property.

A glass transition temperature of a polymer constituting the one or more second layers is preferably less than 80° C., more preferably 40° C. or less, still more preferably 0° C. or less, in order to express a rapid response of the refractive index in any structure. A lower limit of the glass transition temperature is preferably −50° C. or more.

When the glass transition temperature is less than 80° C., the temperature-responsive speed is favorable. When the glass transition temperature is −50° C. or more, the shape retaining property is favorable.

A molecular structure of the polymer constituting the one or more second layers preferably includes an ether bond such as an alkyl ether structure and a phenyl ether structure.

When the ether bond is included, the intermolecular interaction between the temperature-responsive units as well as the intermolecular interaction between the temperature-responsive unit and the ether bond can be achieved, which makes it possible to improve the optically switching function. Among the ether bonds, an alkyl ether structure is more preferable. The reason for this is because the steric hindrance thereof is small and interaction with the temperature-responsive unit easily occurs to express higher optically switching function.

Therefore, it is preferable that the hydrogen-bonding unit have an amide bond and the ether bond have an alkyl ether bond in the polymer constituting the one or more second layers.

The polymer constituting the one or more second layers is not particularly limited and may be appropriately selected depending on the intended purpose. Examples of thereof include poly(N-isopropylacrylamide) (PNIPAM), poly(N-isopropylacrylamide) and polyglycerin stearyl acid ester, polyvinyl pyrrolidone or a derivative thereof, a copolymer thereof, and a mixture thereof. These may be used alone or in combination thereof. Among them, poly(N-isopropylacrylamide) (PNIPAM) is preferable.

In molecular weight of the polymer constituting the one or more second layers, it is preferable that a number average molecular weight (Mn) thereof be from 1,000 through 1,000,000, a weight average molecular weight (Mw) thereof be from 1,000 through 1,000,000, a molecular weight distribution (Mw/Mn) thereof be from 1.0 through 3.0.

The number average molecular weight and the weight average molecular weight can be measured through, for example, GPC (Gel Permeation Chromatography).

The polymer constituting the one or more second layers can be used alone or the composition for the second layer, which includes the polymer constituting the one or more second layers, can also be used. The composition for the second layer is preferable in terms of improvement of tensile strength and dimensional stability.

An amount of the polymer constituting the one or more second layers in the composition for the second layer is preferably 100 ppm by mass or more. When the amount is 100 ppm by mass or more, the optically switching function is favorable.

In addition to the polymer constituting the one or more second layers, a resin (e.g., polycarbonate, polyalkylene carbonate, polyethylene terephthalate, polybutylene terephthalate, polyvinyl alcohol, polyacrylonitrile, and polystyrene), inert particles, an inorganic material (e.g., soda glass and quartz glass), an antioxidant, a thermal degradation inhibitor, a plasticizer, a pigment, or a dye can be added to the composition for the second layer.

The inert particles can be added thereto in order to improve a winding property of the multilayer film.

Examples of the inert particles include: inorganic inert particles (e.g., silica, alumina, calcium carbonate, calcium phosphate, kaolin, and talc); and organic inert particles (e.g., silicone, crosslinked polystyrene, and styrene-divinylbenzene copolymer).

A particle shape of the inert particles is not particularly limited and may be appropriately selected depending on the intended purpose. Examples thereof include an aggregated shape and a spherical shape.

An average particle diameter of the inert particles is preferably 0.01 µm or more but 2 µm or less.

An amount of the inert particles is preferably 0.001% by mass or more but 0.5 by mass or less relative to mass of a layer including the inert particles as a standard. When the preferable numerical range is satisfied, the winding property of the multilayer film can be improved.

<Other Layers>

The other layers are not particularly limited and may be appropriately selected depending on the intended purpose. Examples thereof include a thickness adjusting layer and a heat seal layer.

—Thickness Adjusting Layer—

The multilayer film may include, in addition to the one or more first layers and the one or more second layers, a thickness adjusting layer having an average thickness of 200 nm or more in a part of the configuration where each of the one or more first layers and each of the one or more second layers are alternatively laminated. When a thickness adjusting layer having an average thickness of 200 nm or more is included in a part of the configuration where each of the one or more first layers and each of the one or more second layers are alternatively laminated, it is easy to evenly adjust an average thickness of the multilayer film including the one or more first layers and the one or more second layers without affecting the polarization function.

The thickness adjusting layer may have the same formulation as that of the first layer or the second layer or may have partially the same formulation as the above formulation. The thickness adjusting layer has a large average thickness and thus does not contribute to the reflection properties.

—Heat Seal Layer—

The multilayer film can be provided with a heat seal layer on the surface of the outermost layer of at least one of the first layer and the second layer.

Incorporation of the heat seal layer makes it possible to bind members together via the heat seal layer upon application of heat when the multilayer film as a member of a liquid crystal display is laminated on another member.

As the heat seal layer, it is preferable that a thermoplastic resin having substantially the same melting point as the melting point of the outermost layer of the alternately laminated body or a thermoplastic resin having a melting point lower than the aforementioned melting point be used. However, the same formulation as the formulation of the polymer constituting the one or more second layers is preferably used because it is advantageous in that the heat seal layer can be formed simultaneously with the formation of the alternatively laminated body. Moreover, it is preferable that a melting point of the thermoplastic resin be lower than the melting point of the thermoplastic resin of the one or more first layers by 20° C. or more and be a layer having a thickness of 3 µm or more but 10 µm or less. When the aforementioned melting point and the aforementioned thickness are satisfied, the heat seal layer can strongly bind members together.

When the polymer constituting the one or more second layers is used as the heat seal layer, an average thickness of the heat seal layer is preferably 3 µm or more but 10 µm or less. A layer having an average thickness 4 times or more the maximum thickness 0.5 µm of the layer constituting such an alternately laminated body is a layer that does not contribute to a reflectance in a wavelength band of 400 µm or more but 800 nm or less. This layer is distinguished from an alternately laminated body including the first layer and the second layer.

Within such a range that the property of the heat seal layer is not impaired, a blend product of the material constituting the one or more first layers and the material constituting the one or more second layers can be used.

An average thickness of the multilayer film of the present disclosure is preferably 15 µm or more but 500 µm or less, more preferably 100 µm or more but 200 µm or less. The average thickness of 15 µm or more makes the reflection property appropriate and the average thickness of 500 µm or less makes the handling property favorable, which makes it possible to be used in the wide applications.

An average thickness of the multilayer film can be measured as follows. Specifically, the multilayer film is sandwiched using a spindle gage head (device name: K107C, available from ANRITSU CORPORATION). A differentially electronic digital micrometer (device name: K351, available from ANRITSU CORPORATION) is used to measure the multilayer film for thicknesses at different 10 positions. An average value can be obtained and considered as an average thickness of the multilayer film.

An average reflectance of the multilayer film is preferably less than 5% in a temperature range of 5° C. or more but less than 30° C. and preferably 90% or more in a temperature range of 30° C. or more but less than 60° C., where the average reflectance is obtained under the following conditions. Specifically, the film surface is used as a reflection surface. The measurement is performed at an incident angle of 0 degrees and 50 degrees in a plane of incidence including the stretching direction (X direction) of the uniaxially stretched film. The average reflectance is an average reflectance of a wavelength of 400 nm or more but 800 nm or less (visible light region) with respect to the incident polarized light.

Here, the plane of incidence refers to a surface, which is perpendicular to the reflection surface and includes an incident ray and a reflected ray.

<Method for Producing Multilayer Film>

A method for producing the multilayer film of the present disclosure is as follows. Specifically, the material constituting the one or more first layers and the material constituting the one or more second layers, which have been melted, are each superposed for 50 layers or more and the resultant is extruded to form a multilayer film having a multilayer structure.

A method for forming the multilayer structure in the multilayer film is not particularly limited and may be appropriately selected depending on the intended purpose. Examples thereof include a method for forming the multilayer structure using a multilayer feed block apparatus (available from Musashino Kikai Co., Ltd.).

Two kinds of twin screw extruders are coupled to the multilayer feed block apparatus. In addition, each of the twin screw extruders is coupled to a feed block. The feed block includes: a part that takes responsibility of allocating the melted resins to each part; a part that extends the resin and makes it flat; and a part that combines the flat resins to be laminated. Each extruder is set to a given temperature according to a melting temperature of the polymer. Then, the melted or softened resins are charged into a feed block, which has been set so as to form a desired multilayer configuration. The melted resins that have been laminated are sent to a T die to form a multilayer body. Then, the multilayer body can be subjected to a stretching•cooling step to produce a multilayer film.

Another method for forming a multilayer structure is, for example, a method for forming a multilayer structure using a coating apparatus (available from TOSHIBA MACHINE CO., LTD.). In this method, a resin is dissolved in a solvent to prepare a coating liquid. The coating liquid is coated on a base material such as glass using a die and is subjected to heating•drying at a given temperature based on a boiling point of the solvent used to produce a first layer film. Then, a resin, which is dissolved in a solvent that does not dissolve the resin of the first layer film, is coated on the first layer in the same manner as in the above. Then, the resin subjected to heating•drying at a given temperature based on a boiling point of the solvent used to form a second layer. The aforementioned operation can be repeated for the desired number of times to produce a multilayer film.

The multilayer film obtained in such a manner can be stretched in at least uniaxial direction (direction along the film surface) of a film forming direction or the width direction orthogonal to the film forming direction in order to satisfy optical properties.

Examples of the uniaxially stretched film include: a film stretched only in a uniaxial direction; and a film stretched in a biaxial direction and more strongly stretched in one direction.

The uniaxially stretching direction (X direction) may be a longitudinal direction of the film or a width direction of the film. In the case of the film stretched in a biaxial direction and more strongly stretched in one direction, the direction more strongly stretched (X direction) may be the longitudinal direction of the film or the width direction of the film.

Note that, in the case of the film stretched in a biaxial direction and more strongly stretched in one direction, the "stretching direction" regarding the polarized light and the refractive index refers to a direction in which the film is more strongly stretched.

A method of the stretching is not particularly limited and may be appropriately selected depending on the intended purpose. Examples thereof include heating stretching using a rod heater, roll heat stretching, and tenter stretching. Among them, tenter stretching is preferable in terms of reduction in scratches due to contact with a roll and stretching speed.

A temperature of the stretching is preferably equal to or higher than a glass transition temperature (Tg) but is equal to or lower than the Tg+50° C. Here, the aforementioned glass transition temperature (Tg) is higher one of a glass transition temperature (Tg) of the material constituting the one or more first layers (thermoplastic resin) and a glass transition temperature (Tg) of the material constituting the one or more second layers (polymer).

At this time, a stretching ratio is preferably 2 times or more but 20 times or less, more preferably 2.5 times or more but 10 times or less, still more preferably 3 times or more but 6 times or less, particularly preferably 4.5 times or more but 5.5 times or less.

High stretching ratio is preferable because of the following reasons. First, an unevenness in the surface direction of each of the one or more first layers and the one or more second layers is small because the stretching makes the film thin. Second, the light interference of the multilayer film after the stretching is uniform in the surface direction. Finally, in the stretching direction, a difference between the refractive index of the first layer and the refractive index of the second layer is high.

When the film in the direction (Y direction) orthogonal to the stretching direction is subjected to a stretching treatment to perform the biaxial stretching, a stretching ratio is preferably 1.05 times or more but 1.20 times or less.

When the stretching ratio is 1.05 times or more but 1.20 times or less, the polarization performance is improved.

After the stretching treatment, it is preferable that the film be further subjected to a heat fixing treatment in terms of dimensional stability of the product.

Here, FIG. 1 is a schematic view presenting one example of a multilayer film of the present disclosure and is a multilayer film 10. The multilayer film 10 includes alternately laminated bodies. Each of the alternately laminated bodies includes 50 or more first layers 1 and 50 or more second layers 2 and each of the 50 or more first layers 1 and each of the 50 or more second layers 2 are alternatively laminated.

Figure 2:
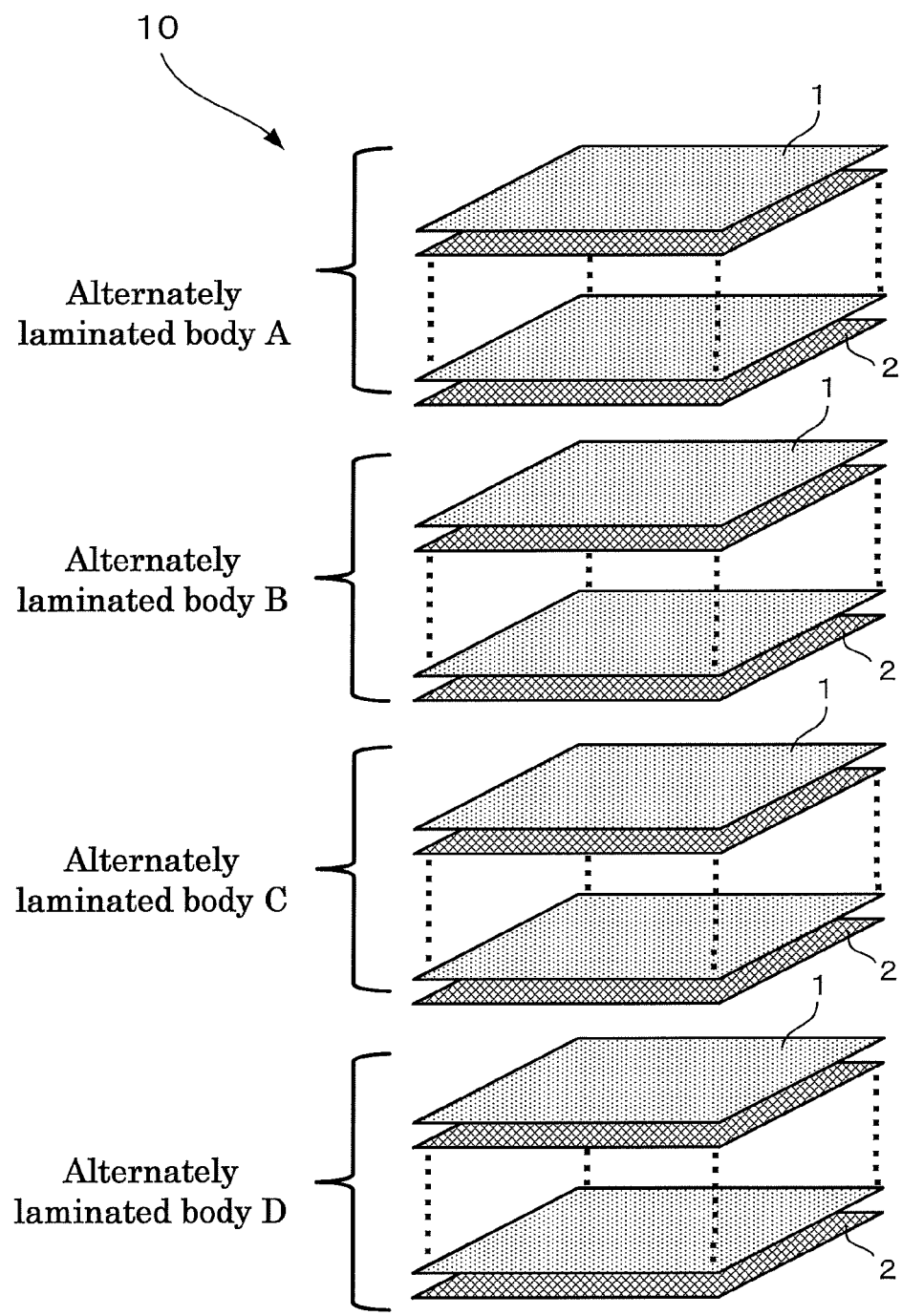
FIG. 2 is a schematic view presenting another example of a multilayer film of the present disclosure.

FIG. 2 is a schematic view presenting another example of a multilayer film of the present disclosure and includes 4 kinds of alternately laminated bodies A to D. Each of the alternately laminated bodies A to D includes 50 or more first layers 1 and 50 or more second layers 2 and each of the 50 or more first layers 1 and each of the 50 or more second layers 2 are alternatively laminated to form a multilayer film 10.

(Multilayer Film Composite)

A multilayer film composite of the present disclosure includes a base material and the multilayer film of the present disclosure on the base material.

The multilayer film of the present disclosure may be provided between the base materials.

The base material preferably includes at least one selected from a polyester resin, a polycarbonate resin, an epoxy resin, an acrylic resin, and a silicate salt.

Examples of the silicate salt include silicon dioxide, borosilicate, and aluminosilicate.

The base material has a function of supporting the multilayer film. In the present disclosure, an inorganic glass made of a silicate salt is preferable because it is inexpensive and excellent in transparency and abrasion resistance.

The inorganic glass is not particularly limited and may be appropriately selected depending on the intended purpose. Examples thereof include a soda-lime glass, a borosilicate glass, a lead glass, an aluminosilicate glass, a tempered glass, and a glass including no metal.

A thickness of the base material is not particularly limited and may be appropriately selected depending on the intended purpose, but is preferably 10 μm or more but 3 mm or less.

The multilayer film composite may be produced by producing the multilayer film and then bonding the multilayer film together with the base material. Alternatively, the multilayer film composite may be produced by superposing one multilayer film or several multilayer films on the base material. In the present disclosure, a method for producing the multilayer film composite by producing the multilayer film and then bonding the multilayer film to the base material is preferable in terms of simplicity of the production.

<Application>

The multilayer film and the multilayer film composite of the present disclosure can be suitably used in various application fields requiring optical control such as windows for buildings and windows for various vehicles (e.g., automobiles).

(Optical Component)

An optical component of the present disclosure includes the multilayer film of the present disclosure or the multilayer film composite of the present disclosure, and further includes other members if necessary.

The optical component can be used for, for example, a lens base material and, particularly, an optical component transmitting light (i.e., passive optical component).

As a functional device provided with the optical component, for example, various display devices (e.g., liquid crystal display and plasma display), various projector devices (e.g., OHP and liquid crystal projector), optical fiber communication devices (e.g., optical waveguide and optical amplifier), and photographing devices (e.g., camera and video) are exemplified. Examples of the passive optical component in such an optically functional device include a lens, a prism, a prism sheet, a panel, a film, an optical waveguide, an optical disk, and a LED encapsulating material. Among them, a lens base material is particularly preferable.

The lens base material means a single member capable of achieving a function of lens. A film or a member can be provided on the surface of the lens base material or around the lens base material based on the environment under which the lens is used and the application field. For example, around the surface of the lens base material, for example, a protective film, a reflection preventing film, or a hard coat film can be formed. A frame for retaining a base material can be fit into the periphery of the lens base material to be fixed.

When the lens base material is used as the lens, the lens base material itself may be used alone or the lens to which a film or a frame has been added as described above may be used.

The lens base material is suitably used for, for example, a spectacle lens, a lens for an optical apparatus, a lens for optoelectronics, a lens for laser, a pickup lens, a lens for a car camera recorder, a lens for a handy camera, a lens for a digital camera, a lens for OHP, and a microlens array.

(Window)

A window of the present disclosure includes the multilayer film of the present disclosure or the multilayer film composite of the present disclosure, and further includes other members if necessary.

The window preferably includes the multilayer film of the present disclosure on the base material glass.

The base material glass is not particularly limited and may be appropriately selected depending on the intended purpose. Examples thereof include a single layer glass, a laminated glass, a tempered laminated glass, an insulated glazing, a tempered insulated glazing, and a laminated insulated glazing.

The window can be widely used for various fields such as a window glasses for various vehicles (e.g., automobile, bus, truck, train, bullet train, airplane, passenger plane, and ship) and a building glass used for an opening section and a partition of a building (e.g., typical detached house, condominium, office building, store, public facility, and factory facility).

EXAMPLES

The present disclosure will be described in more detail by way of the following Examples. However, the present disclosure should not be construed as being limited to these Examples.

<Average Thickness of First Layer and Average Thickness of Second Layer>

An average thickness of the first layer and an average thickness of the second layer were measured as described below. Each of the multilayer films prepared was cut to a sample in the longitudinal direction of 1 cm and the width direction of 1 cm. Then, a microtome (device name: ULTRACUT UCT, available from LEICA) was used to cut the sample perpendicularly to the wide direction to obtain a thin film slice having a thickness of 5 nm. A transmission electron microscope (device name: Hitachi S-4300, available from Hitachi, Ltd.) was used to take a photo at an acceleration voltage of 100 kV. From the image photographed, each of the first layer and the second layer was measured at different five points to determine an average value. Each of the values was considered as an average value of the first layer and an average value of the second layer.

<Average Thickness of Multilayer Film>

The multilayer film prepared was sandwiched using a spindle gage head (device name: K107C, available from ANRITSU CORPORATION). A differentially electronic digital micrometer (device name: K351, available from ANRITSU CORPORATION) was used to measure the multilayer film for a thickness at different 10 positions. An average value was determined and considered as an average thickness of the multilayer film.

<Minimum Refractive Index $R_A$ of Material Constituting One or More First Layers at 5° C. or More but Less than 30° C., Minimum Refractive Index $R_B$ of a Material Constituting the One or More Second Layers at 5° C. or More but Less than 30° C., Maximum Refractive Index $R_C$ of the Material Constituting One or More First Layers at 30° C. or More but Less than 60° C., and Maximum Refractive Index $R_D$ of the Material Constituting the One or More Second Layers at 30° C. or More but Less than 60° C.>

An Abbe refractometer (DR-M2, available from ATAGO CO., LTD.) was used to measure all of the refractive indices $R_A$, $R_B$, $R_C$, and $R_D$ as described below.

The material constituting the one or more first layers and the material constituting the one or more second layers were each dissolved in ethanol to form a coating liquid. Then, the coating liquid was cast on a measurement part of the Abbe refractometer and was dried.

Each of the $R_A$ and the $R_B$ was the minimum value among refractive indices measured at set temperatures of 5° C., 10° C., 15° C., 20° C., 25° C., and 29° C. with a measurement wavelength of the Abbe refractometer being set to 589 nm.

Each of the $R_C$ and the $R_D$ was the maximum value among refractive indices measured at set temperatures of 30° C., 35° C., 40° C., 45° C., 50° C., 55° C., and 59° C. with a measurement wavelength of the Abbe refractometer being set to 589 nm.

Synthesis Example 1

Into a polymerization tube, N-isopropylacrylamide (product number: 2210-25-5, available from Tokyo Chemical Industry Co., Ltd. (TCI)) (7 mmol), 2-phenoxyethyl acrylate (product number: 48145-04-6, available from Tokyo Chemical Industry Co., Ltd. (TCI)) (3 mmol), 2,2-azoisobutyronitrile (AIBN, product number: 78-67-1, available from Tokyo Chemical Industry Co., Ltd. (TCI)) (0.06 mol), and N,N-dimethylformamide (DMF, available from Tokyo Chemical Industry Co., Ltd. (TCI)) (10 mL) were charged and dissolved. Then, the polymerization tube was subjected to freeze-pump-thaw and then was sealed.

Next, the polymerization tube was heated to 60° C. and was allowed to react at 60° C. for 20 hours. Then, chloroform (10 mL) was added to the reaction solution to dilute the reaction solution. The diluted solution was added dropwise to diethyl ether to precipitate a white precipitate. The precipitate was separated and was subjected to vacuum drying at 40° C. for 24 hours.

As described above, poly(N-isopropylacrylamide) (PNIPAM)-phenoxyethyl acrylate copolymer 1, in which a molar ratio between N-isopropylacrylamide and phenoxyethyl acrylate is 7:3, was obtained.

Synthesis Example 2

Poly(N-isopropylacrylamide) (PNIPAM)-phenoxyethyl acrylate copolymer 2, in which a molar ratio between N-isopropylacrylamide and phenoxyethyl acrylate is 6:4, was obtained in the same manner as in Synthesis Example 1 except that an amount of N-isopropylacrylamide (product number: 2210-25-5, available from Tokyo Chemical Industry Co., Ltd. (TCI)) was changed to 6 mol and an amount of 2-phenoxyethyl acrylate (product number: 48145-04-6, available from Tokyo Chemical Industry Co., Ltd. (TCI)) was changed to 4 mol.

Synthesis Example 3

Poly(N-isopropylacrylamide) (PNIPAM)-phenoxyethyl acrylate copolymer 3, in which a molar ratio between N-isopropylacrylamide and phenoxyethyl acrylate is 8:2, was obtained in the same manner as in Synthesis Example 1 except that an amount of N-isopropylacrylamide (product number: 2210-25-5, available from Tokyo Chemical Industry Co., Ltd. (TCI)) was changed to 8 mol and an amount of 2-phenoxyethyl acrylate (product number: 48145-04-6, available from Tokyo Chemical Industry Co., Ltd. (TCI)) was changed to 2 mol.

Synthesis Example 4

Poly(N-isopropylacrylamide) (PNIPAM)-phenoxyethyl acrylate copolymer 4, in which a molar ratio between N-isopropylacrylamide and phenoxyethyl acrylate is 9:1, was obtained in the same manner as in Synthesis Example 1 except that an amount of N-isopropylacrylamide (product number: 2210-25-5, available from Tokyo Chemical Industry Co., Ltd. (TCI)) was changed to 9 mol and an amount of 2-phenoxyethyl acrylate (product number: 48145-04-6, available from Tokyo Chemical Industry Co., Ltd. (TCI)) was changed to 1 mol.

Synthesis Example 5

Azobenzene-including poly(N-isopropylacrylamide) (PNIPAM)-phenoxyethyl acrylate copolymer 5 was obtained in the same manner as in Synthesis Example 1 except that azonenzene was added so as to be 5% by mass relative to the poly(N-isopropylacrylamide) (PNIPAM)-phenoxyethyl acrylate copolymer 1.

Example 1

<Preparation of Alternately Laminated Body A>

Poly(methyl methacrylate) (PMMA, product number: 182230, available from Aldrich) was used as the first layer and the poly(N-isopropylacrylamide) (PNIPAM)-phenoxyethyl acrylate copolymer 1 of Synthesis Example 1 was used as the second layer. Then, the materials were set on a multilayer feed block apparatus (available from Musashino Kikai Co., Ltd.) and a temperature of a die A of the multilayer feed block apparatus was set to 135° C. One hundred first layers and one hundred second layers were laminated, each of the one hundred first layers and each of the one hundred second layers being alternatively laminated, to prepare an alternately laminated body A before stretching.

The total number of the alternately laminated body A before stretching obtained was 200 layers, an average thickness of the first layer was 150 nm, and an average thickness of the second layer was 100 nm.

<Preparation of Alternately Laminated Body B>

A die B of the multilayer feed block apparatus was used and a temperature of the die B was set to 135° C. One hundred first layers and one hundred second layers were laminated, each of the one hundred first layers and each of the one hundred second layers being alternatively laminated, to prepare an alternately laminated body B before stretching.

The total number of the alternately laminated body B before stretching obtained was 200 layers, an average thickness of the first layer was 150 nm, and an average thickness of the second layer was 115 nm.

<Preparation of Alternately Laminated Body C>

A die C of the multilayer feed block apparatus was used and a temperature of the die C was set to 135° C. One hundred first layers and one hundred second layers were laminated, each of the one hundred first layers and each of the one hundred second layers being alternatively laminated, to prepare an alternately laminated body C before stretching.

The total number of the alternately laminated body C before stretching obtained was 200 layers, an average thickness of the first layer was 150 nm, and an average thickness of the second layer was 130 nm.

<Preparation of Alternately Laminated Body D>

A die D of the multilayer feed block apparatus was used and a temperature of the die D was set to 135° C. One hundred first layers and one hundred second layers were laminated, each of the one hundred first layers and each of the one hundred second layers being alternatively laminated, to prepare an alternately laminated body D before stretching.

The total number of the alternately laminated body D before stretching obtained was 200 layers, an average thickness of the first layer was 150 nm, and an average thickness of the second layer was 145 nm.

<Preparation of Multilayer Film 1>

The alternately laminated body A before stretching, the alternately laminated body B before stretching, the alternately laminated body C before stretching, and the alternately laminated body D before stretching, which had been prepared, were superposed in this order and were heated to 150° C. with an infrared heater built in the multilayer feed block apparatus. The resultant was stretched with multilayer feed block apparatus at a stretching ratio of 10 times to obtain a multilayer film 1 having the total number of laminated layers of 800 layers and an average thickness of 109 μm.

Example 2

A multilayer film 2 having the total number of laminated layers of 400 layers and an average thickness of 54.5 μm was prepared in the same manner as in Example 1 except that the number of the first layers and the number of the second layers, where the first layers and the second layers were used for preparing the alternately laminated body A before stretching, the alternately laminated body B before stretching, the alternately laminated body C before stretching, and the alternately laminated body D before stretching, were each changed to 50 layers.

Example 3

A multilayer film 3 having the total number of laminated layers of 960 layers and an average thickness of 130.8 μm was prepared in the same manner as in Example 1 except that the number of the first layers and the number of the second layers, where the first layers and the second layers were used for preparing the alternately laminated body A before stretching, the alternately laminated body B before stretching, the alternately laminated body C before stretching, and the alternately laminated body D before stretching, were each changed to 120 layers.

Example 4

A multilayer film 4 having the total number of laminated layers of 600 layers and an average thickness of 79.5 μm was prepared in the same manner as in Example 1 except that the alternately laminated body D was not prepared.

Example 5

A multilayer film 5 having the total number of laminated layers of 1,200 layers and an average thickness of 163.5 μm was prepared in the same manner as in Example 1 except that the number of the first layers and the number of the second layers, where the first layers and the second layers were used for preparing the alternately laminated body A before stretching, the alternately laminated body B before stretching, the alternately laminated body C before stretching, and the alternately laminated body D before stretching, were each changed to 150 layers.

Example 6

A multilayer film 6 having the total number of laminated layers of 1,200 layers and an average thickness of 163.5 μm was prepared in the same manner as in Example 5, except that the poly(N-isopropylacrylamide) (PNIPAM)-phenoxyethyl acrylate copolymer 1 of Synthesis Example 1 was changed to the poly(N-isopropylacrylamide) (PNIPAM)-phenoxyethyl acrylate copolymer 2 of Synthesis Example 2, as the second layer.

Example 7

A multilayer film 7 having the total number of laminated layers of 1,200 layers and an average thickness of 133.5 μm was prepared in the same manner as in Example 5, except that an average thickness of the first layer, where the first layer was used for preparing the alternately laminated body A before stretching, the alternately laminated body B before stretching, the alternately laminated body C before stretching, and the alternately laminated body D before stretching, was changed to 100 nm.

Example 8

A multilayer film 8 having the total number of laminated layers of 1,200 layers and an average thickness of 193.5 μm was prepared in the same manner as in Example 5, except that an average thickness of the first layer, where the first layer was used for preparing the alternately laminated body A before stretching, the alternately laminated body B before stretching, the alternately laminated body C before stretching, and the alternately laminated body D before stretching, was changed to 200 nm.

Example 9

A multilayer film 9 having the total number of laminated layers of 1,200 layers and an average thickness of 163.5 μm was prepared in the same manner as in Example 5, except that the poly(N-isopropylacrylamide) (PNIPAM)-phenoxyethyl acrylate copolymer 1 of Synthesis Example 1 was changed to the poly(N-isopropylacrylamide) (PNIPAM)-phenoxyethyl acrylate copolymer 3 of Synthesis Example 3, as the second layer.

Example 10

A multilayer film 10 having the total number of laminated layers of 1,600 layers and an average thickness of 218 μm was prepared in the same manner as in Example 5, except that the poly(N-isopropylacrylamide) (PNIPAM)-phenoxyethyl acrylate copolymer 1 of Synthesis Example 1 was changed to the poly(N-isopropylacrylamide) (PNIPAM)-phenoxyethyl acrylate copolymer 4 of Synthesis Example 4 and the number of the first layers and the number of the second layers, where the first layers and the second layers were used for preparing the alternately laminated body A before stretching, the alternately laminated body B before stretching, the alternately laminated body C before stretching, and the alternately laminated body D before stretching, were each changed to 200 layers.

Example 11

A multilayer film 11 having the total number of laminated layers of 2,000 layers and an average thickness of 272.5 μm was prepared in the same manner as in Example 10, except that the number of the first layers and the number of the second layers, where the first layers and the second layers were used for preparing the alternately laminated body A before stretching, the alternately laminated body B before stretching, the alternately laminated body C before stretching, and the alternately laminated body D before stretching, were each changed to 250 layers.

Example 12

A multilayer film 12 having the total number of laminated layers of 2,400 layers and an average thickness of 327 μm was prepared in the same manner as in Example 10, except that the number of the first layers and the number of the second layers, where the first layers and the second layers were used for preparing the alternately laminated body A before stretching, the alternately laminated body B before stretching, the alternately laminated body C before stretching, and the alternately laminated body D before stretching, were each changed to 300 layers.

Example 13

—Preparation of Multilayer Film Composite—
<Alternately Laminated Body A>
Polymethyl methacrylate was dissolved in a mixed solution including toluene and cyclohexane at a mass ratio of 5:1 to prepare a 4% by mass coating liquid. On a polycarbonate resin base material having a thickness of 5 mm, the coating liquid was coated at a rate of 200 mm/sec with a wire bar designed to have a wet thickness of 4 μm and was dried at 40° C. for 10 minutes to form a film as a first layer.

Next, the poly(N-isopropylacrylamide) (PNIPAM)-phenoxyethyl acrylate copolymer 1 (molar ratio: 7:3) of Synthesis Example 1 was dissolved in ethanol to prepare a 3.5% by mass coating liquid. On the first layer, the coating liquid was coated at a rate of 200 mm/sec with a wire bar designed to have a wet thickness of 4 μm and was dried at 40° C. for 10 minutes to form a film as a second layer. Therefore, the second layer was formed on the first layer. This operation was repeated to prepare an alternately laminated body A, which was similar to one as described in Example 1.
<Alternately Laminated Body B>
An alternately laminated body B was obtained in the same manner as in Example 1 except that the coating speed of the second layer in the <Preparation of alternately laminated body A> was changed to 180 mm/sec. The alternately laminated body B was prepared on the alternately laminated body A.
<Alternately Laminated Body C>
An alternately laminated body C was obtained in the same manner as in Example 1 except that the coating speed of the second layer in the <Preparation of alternately laminated body A> was changed to 160 mm/sec. The alternately laminated body C was prepared on the alternately laminated bodies AB.
<Alternately Laminated Body D>
An alternately laminated body D was obtained in the same manner as in Example 1 except that the coating speed of the second layer in the <Preparation of alternately laminated body A> was changed to 140 mm/sec. The alternately laminated body D was prepared on the alternately laminated bodies ABC.

As described above, a multilayer film composite 1 was prepared.

Example 14

—Preparation of Multilayer Film Composite—
A multilayer film composite 2 was prepared in the same manner as in Example 13 that the polycarbonate resin base material was changed to a borosilicate glass having a thickness of 5 mm.

Example 15

—Preparation of Multilayer Film Composite—
A multilayer film composite 3 was prepared in the same manner as in Example 13 except that polymethyl methacrylate was changed to polyethylene carbonate and a concentration of the coating liquid of the first layer was changed to 3% by mass, the coating speed of the second layer in the <Preparation of alternately laminated body A> was changed to 120 mm/sec, the coating speed of the second layer in the <Preparation of alternately laminated body B> was changed to 100 mm/sec, the coating speed of the second layer in the <Preparation of alternately laminated body C> was changed to 80 mm/sec, and the coating speed of the second layer in the <Preparation of alternately laminated body D> was changed to 60 mm/sec.

Comparative Example 1

A multilayer film 13 having the total number of laminated layers of 800 layers and an average thickness of 109 μm was prepared in the same manner as in Example 1, except that the poly(N-isopropylacrylamide) (PNIPAM)-phenoxyethyl acrylate copolymer 1 of Synthesis Example 1 was changed to the azobenzene-including poly(N-isopropylacrylamide) (PNIPAM)-phenoxyethyl acrylate copolymer 5 of Synthesis Example 5, as the second layer.

Comparative Example 2

A multilayer film 14 having the total number of laminated layers of 960 layers and an average thickness of 130.8 μm was prepared in the same manner as in Comparative Example 1 except that the number of the first layers and the number of the second layers, where the first layers and the second layers were used for preparing the alternately laminated body A before stretching, the alternately laminated body B before stretching, the alternately laminated body C before stretching, and the alternately laminated body D before stretching, were each changed to 120 layers.

Comparative Example 3

A multilayer film 15 having the total number of laminated layers of 1,200 layers and an average thickness of 133.5 μm was prepared in the same manner as in Comparative Example 1 except that an average thickness of the first layer was changed to 100 nm and the number of the first layers and the number of the second layers were each changed to 150 layers, where the first layers and the second layers were used for preparing the alternately laminated body A before stretching, the alternately laminated body B before stretching, the alternately laminated body C before stretching, and the alternately laminated body D before stretching.

The multilayer films 1 to 15 and the multilayer film composites 1 to 3, which were obtained in Examples and Comparative Examples, were evaluated for various properties. Results are presented in the following Tables (Tables 1-1-1, 1-1-2, 1-1-3, Table 1-2, and Table 2 to 4).

<Evaluation of Transmissivity>

In a spectrophotometer (device name: MPC-3100, available from SHIMADZU CORPORATION), a polarizing filter was mounted at a side of the light source. A relative specular reflectance of the sample to a mirror on which aluminum had been deposited was measured in a wavelength range of 400 nm or more but less than 1,200 nm. At this time, a measured value, which was obtained when the transmission axis of the polarizing filter was arranged so as to be matched with the stretching direction (X direction) of the film, was regarded as P-polarized light. A measured value, which was obtained when the transmission axis of the polarizing filter was arranged so as to be orthogonal to the stretching direction of the film, was regarded as S-polarized light. Regarding the components of polarized lights (P-polarized light and S-polarized light), an average reflectance of visible light (i.e., an average value of reflectance in a wavelength range of 400 nm or more but less than 800 nm) and an average reflectance of near infrared rays (i.e., an average value of reflectance in a wavelength range of 800 nm or more but less than 1,200 nm) were measured to calculate "transmittance" using the following Expression 1. Based on the following evaluation criteria, transmissivity at 5° C. or more but less than 30° C. and transmissivity at 30° C. or more but less than 60° C. were evaluated.

Transmittance (%)=100(%)−reflectance (%)    [Expression 1]

[Evaluation Criteria of Transmittance of Wavelength of 400 nm or More but Less than 800 nm (Visible Light)]
- 10 points: 90% or more
- 8 points: 80% or more but less than 90%
- 0 points: less than 80%

[Evaluation Criteria of Transmittance of Wavelength of 800 nm or More but Less than 1,200 nm (Near Infrared Rays) at 5° C. or More but Less than 30° C.]
- 10 points: 90% or more
- 8 points: 80% or more but less than 90%
- 0 points: less than 80%

[Evaluation Criteria of Transmittance of Wavelength of 800 nm or More but Less than 1,200 nm (Near Infrared Rays) at 30° C. or More but Less than 60° C.]
- 10 points: less than 5%
- 9 points: 5% or more but less than 10%
- 8 points: 10% or more but less than 20%
- 0 points: 20% or more <Manufacturability>

The larger the number of laminated layers of each multilayer film is, many laminating steps are required. Therefore, from the number of laminated layers of each multilayer film, the manufacturability was evaluated based on the following evaluation criteria.

[Evaluation Criteria]
- 10 points: The total number of laminated layers is 80 layers or more but less than 500 layers.
- 5 points: The total number of laminated layers is 500 layers or more but less than 1,000 layers.
- 2 points: The total number of laminated layers is 1,000 layers or more but less than 1,500 layers.
- 0 points: The total number of laminated layers is 1,500 layers or more.

<Evaluation of Property of Maintaining Visibility>

As presented in the following Expression 7, a ratio of maintaining visibility (%) was determined and was evaluated based on the following evaluation criteria. Here, the ratio of maintaining visibility (%) is a ratio of a transmittance (%) in a wavelength range of 400 nm or more but less than 800 nm at 30° C. or more but less than 60° C. to a transmittance (%) in a wavelength range of 400 nm or more but less than 800 nm at 5° C. or more but less than 30° C.

Ratio of maintaining visibility (%)={(transmittance (%) in a wavelength range of 400 nm or more but less than 800 nm at 30° C. or more but less than 60° C.)/(transmittance (%) in a wavelength range of 400 nm or more but less than 800 nm at 5° C. or more but less than 30° C.)}×100    [Expression 7]

[Evaluation Criteria]
- 10 points: The ratio of maintaining visibility is 90% or more.
- 0 points: The ratio of maintaining visibility is less than 90%.

<Comprehensive Evaluation>

The total point of all evaluations, which is the sum of the point of each evaluation, was determined (maximum: 60 points). The comprehensive evaluation was performed based on the following evaluation criteria. The comprehensive evaluation satisfying A, B, C, D, E, F, and G is considered as a practically usable level.

[Evaluation Criteria]
- A: 59 points or more but 60 points or less
- B: 53 points or more but less than 59 points
- C: 50 points or more but less than 53 points
- D: 48 points or more but less than 50 points
- E: 46 points or more but less than 48 points
- F: 45 points or more but less than 46 points
- G: 44 points or more but less than 45 points
- H: less than 44 points, or 0 points in one of the evaluation items.

TABLE 1-1-1

|  |  |  | First layer | | | | | Second layer |
|---|---|---|---|---|---|---|---|---|
|  | Alternately laminated body | Material | Minimum refractive index $R_A$ | Maximum refractive index $R_C$ | Average thickness (nm) | Number of laminated layers | Material (Molar ratio) | Minimum refractive index $R_B$ |
| Example 1 | A B C D | Polymethyl methacrylate | 1.4555 | 1.4543 | 150 | 100 | Synthesis Example 1 (7:3) | 1.4564 |
| Example 2 | A B C D | Polymethyl methacrylate | 1.4555 | 1.4543 | 150 | 50 | Synthesis Example 1 (7:3) | 1.4564 |

TABLE 1-1-1-continued

| | Alternately laminated body | Material | Minimum refractive index $R_A$ | Maximum refractive index $R_C$ | Average thickness (nm) | Number of laminated layers | Material (Molar ratio) | Minimum refractive index $R_B$ |
|---|---|---|---|---|---|---|---|---|
| Example 3 | A B C D | Polymethyl methacrylate | 1.4555 | 1.4543 | 150 | 120 | Synthesis Example 1 (7:3) | 1.4564 |
| Example 4 | A B C D | Polymethyl methacrylate | 1.4555 — | 1.4543 — | 150 — | 100 — | Synthesis Example 1 (7:3) | 1.4564 — |
| Example 5 | A B C D | Polymethyl methacrylate | 1.4555 | 1.4543 | 150 | 150 | Synthesis Example 1 (7:3) | 1.4564 |
| Example 6 | A B C D | Polymethyl methacrylate | 1.4555 | 1.4543 | 150 | 150 | Synthesis Example 2 (6:4) | 1.4692 |

| | Alternately laminated body | Second layer Maximum refractive index $R_D$ | Average thickness (nm) | Number of laminated layers | Total number of laminated layers | Difference of refractive index $R_B - R_A$ | $R_D - R_C$ |
|---|---|---|---|---|---|---|---|
| Example 1 | A B C D | 1.5541 | 100 115 130 145 | 100 | 800 | 0.001 | 0.100 |
| Example 2 | A B C D | 1.5541 | 100 115 130 145 | 50 | 400 | 0.001 | 0.100 |
| Example 3 | A B C D | 1.5541 | 100 115 130 145 | 120 | 960 | 0.001 | 0.100 |
| Example 4 | A B C D | 1.5541 — | 100 115 130 — | 100 — | 600 | 0.001 | 0.100 |
| Example 5 | A B C D | 1.5541 | 100 115 130 145 | 150 | 1200 | 0.001 | 0.100 |
| Example 6 | A B C D | 1.5407 | 100 115 130 145 | 150 | 1200 | 0.014 | 0.086 |

TABLE 1-1-2

| | Alternately laminated body | First layer Material | Minimum refractive index $R_A$ | Maximum refractive index $R_C$ | Average thickness (nm) | Number of laminated layers | Second layer Material (Molar ratio) | Minimum refractive index $R_B$ |
|---|---|---|---|---|---|---|---|---|
| Example 7 | A B C D | Polymethyl methacrylate | 1.4555 | 1.4543 | 100 | 150 | Synthesis Example 1 (7:3) | 1.4564 |
| Example 8 | A B C D | Polymethyl methacrylate | 1.4555 | 1.4543 | 200 | 150 | Synthesis Example 1 (7:3) | 1.4564 |
| Example 9 | A B C D | Polymethyl methacrylate | 1.4555 | 1.4543 | 150 | 150 | Synthesis Example 3 (8:2) | 1.4464 |
| Example 10 | A B C D | Polymethyl methacrylate | 1.4555 | 1.4543 | 150 | 200 | Synthesis Example 4 (9:1) | 1.4475 |
| Example 11 | A B C D | Polymethyl methacrylate | 1.4555 | 1.4543 | 150 | 250 | Synthesis Example 4 (9:1) | 1.4475 |

TABLE 1-1-2-continued

| | | | | | | | | |
|---|---|---|---|---|---|---|---|---|
| Example 12 | A B C D | Polymethyl methacrylate | 1.4555 | 1.4543 | 150 | 300 | Synthesis Example 4 (9:1) | 1.4475 |

| | Alternately laminated body | Second layer | | | Total | Difference of refractive index | |
|---|---|---|---|---|---|---|---|
| | | Maximum refractive index $R_D$ | Average thickness (nm) | Number of laminated layers | number of laminated layers | $R_B - R_A$ | $R_D - R_C$ |
| Example 7 | A B C D | 1.5541 | 100 115 130 145 | 150 | 1200 | 0.001 | 0.100 |
| Example 8 | A B C D | 1.5541 | 100 115 130 145 | 150 | 1200 | 0.001 | 0.100 |
| Example 9 | A B C D | 1.5040 | 100 115 130 145 | 150 | 1200 | −0.009 | 0.050 |
| Example 10 | A B C D | 1.4594 | 100 115 130 145 | 200 | 1600 | −0.008 | 0.005 |
| Example 11 | A B C D | 1.4594 | 100 115 130 145 | 250 | 2000 | −0.008 | 0.005 |
| Example 12 | A B C D | 1.4594 | 100 115 130 145 | 300 | 2400 | −0.008 | 0.005 |

TABLE 1-1-3

| | Alternately laminated body | First layer | | | | | Second layer |
|---|---|---|---|---|---|---|---|
| | | Material | Minimum refractive index $R_A$ | Maximum refractive index $R_C$ | Average thickness (nm) | Number of laminated layers | Material (Molar ratio) | Minimum refractive index $R_B$ |
| Comparative Example 1 | A B C D | Polymethyl methacrylate | 1.4555 | 1.4543 | 150 | 100 | Synthesis Example 5 (7:3) | 1.4605 |
| Comparative Example 2 | A B C D | Polymethyl methacrylate | 1.4555 | 1.4543 | 150 | 120 | Synthesis Example 5 (7:3) | 1.4605 |
| Comparative Example 3 | A B C D | Polymethyl methacrylate | 1.4555 | 1.4543 | 100 | 150 | Synthesis Example 5 (7:3) | 1.4605 |

| | Alternately laminated body | Second layer | | | Total | Difference of refractive index | |
|---|---|---|---|---|---|---|---|
| | | Maximum refractive index $R_D$ | Average thickness (nm) | Number of laminated layers | number of laminated layers | $R_B - R_A$ | $R_D - R_C$ |
| Comparative Example 1 | A B C D | 1.6042 | 100 115 130 145 | 100 | 800 | 0.005 | 0.150 |
| Comparative Example 2 | A B C D | 1.6042 | 100 115 130 145 | 120 | 960 | 0.005 | 0.150 |

TABLE 1-1-3-continued

| | | | | | | | | |
|---|---|---|---|---|---|---|---|---|
| Comparative Example 3 | A | 1.6042 | 100 | 150 | 1200 | 0.005 | 0.150 |
| | B | | 115 | | | | |
| | C | | 130 | | | | |
| | D | | 145 | | | | |

TABLE 1-2

| | Alternately laminated body | Material | First layer | | | | Second layer | |
|---|---|---|---|---|---|---|---|---|
| | | | Minimum refractive index $R_A$ | Maximum refractive index $R_C$ | Average thickness (nm) | Number of laminated layers | Material (Molar ratio) | Minimum refractive index $R_B$ |
| Example 13 | A B C D | Polymethyl methacrylate | 1.4555 | 1.4543 | 150 | 50 | Synthesis Example 1 (7:3) | 1.4564 |
| Example 14 | A B C D | Polymethyl methacrylate | 1.4555 | 1.4543 | 150 | 50 | Synthesis Example 1 (7:3) | 1.4564 |
| Example 15 | A B C D | Polyethylene carbonate | 1.4660 | 1.4648 | 100 | 50 | Synthesis Example 1 (7:3) | 1.4564 |

| | Alternately laminated body | Second layer | | | Base material | Total number of laminated layers | Difference of refractive index | |
|---|---|---|---|---|---|---|---|---|
| | | Maximum refractive index $R_D$ | Average thickness (nm) | Number of laminated layers | | | $R_B - R_A$ | $R_D - R_C$ |
| Example 13 | A B C D | 1.5541 | 100 115 130 145 | 50 | Poly-carbonate | 400 | 0.001 | 0.100 |
| Example 14 | A B C D | 1.5541 | 100 115 130 145 | 50 | Borosilicate glass | 400 | 0.001 | 0.100 |
| Example 15 | A B C D | 1.5541 | 150 165 180 195 | 50 | Poly-carbonate | 400 | −0.010 | 0.089 |

TABLE 2

Evaluation of transmissivity of visible light

| | Summer environment (30° C. or more but less than 60° C.) | | | Winter environment (5° C. or more but less than 30° C.) | | |
|---|---|---|---|---|---|---|
| | Reflectance (%) | Transmittance (%) | Point | Reflectance (%) | Transmittance (%) | Point |
| Example 1 | 11 | 89 | 8 | 7 | 93 | 10 |
| Example 2 | 8 | 92 | 10 | 5 | 95 | 10 |
| Example 3 | 19 | 81 | 8 | 15 | 85 | 8 |
| Example 4 | 15 | 85 | 8 | 6 | 94 | 10 |
| Example 5 | 18 | 82 | 8 | 11 | 89 | 8 |
| Example 6 | 20 | 80 | 8 | 19 | 81 | 8 |
| Example 7 | 20 | 80 | 8 | 17 | 83 | 8 |
| Example 8 | 20 | 80 | 8 | 17 | 83 | 8 |
| Example 9 | 19 | 81 | 8 | 18 | 82 | 8 |
| Example 10 | 20 | 80 | 8 | 20 | 80 | 8 |
| Example 11 | 20 | 80 | 8 | 20 | 80 | 8 |
| Example 12 | 20 | 80 | 8 | 20 | 80 | 8 |
| Comparative Example 1 | 70 | 30 | 0 | 7 | 93 | 10 |

TABLE 2-continued

Evaluation of transmissivity of visible light

| | Summer environment (30° C. or more but less than 60° C.) | | | Winter environment (5° C. or more but less than 30° C.) | | |
|---|---|---|---|---|---|---|
| | Reflectance (%) | Transmittance (%) | Point | Reflectance (%) | Transmittance (%) | Point |
| Comparative Example 2 | 75 | 25 | 0 | 15 | 85 | 8 |
| Comparative Example 3 | 80 | 20 | 0 | 17 | 83 | 8 |
| Example 13 | 11 | 89 | 8 | 10 | 90 | 10 |
| Example 14 | 12 | 88 | 8 | 11 | 89 | 8 |
| Example 15 | 20 | 80 | 8 | 19 | 81 | 8 |

TABLE 3

Evaluation of transmissivity of near infrared rays

| | Summer environment (30° C. or more but less than 60° C.) | | | Winter environment (5° C. or more but less than 30° C.) | | |
|---|---|---|---|---|---|---|
| | Reflectance (%) | Transmittance (%) | Point | Reflectance (%) | Transmittance (%) | Point |
| Example 1 | 99 | 1 | 10 | 5 | 95 | 10 |
| Example 2 | 95 | 5 | 9 | 4 | 96 | 10 |
| Example 3 | 99 | 1 | 10 | 10 | 90 | 10 |
| Example 4 | 82 | 18 | 8 | 5 | 95 | 10 |
| Example 5 | 99 | 1 | 10 | 10 | 90 | 10 |
| Example 6 | 99 | 1 | 10 | 10 | 90 | 10 |
| Example 7 | 99 | 1 | 10 | 15 | 85 | 8 |
| Example 8 | 99 | 1 | 10 | 20 | 80 | 8 |
| Example 9 | 95 | 5 | 9 | 17 | 83 | 8 |
| Example 10 | 99 | 1 | 10 | 18 | 82 | 8 |
| Example 11 | 99 | 1 | 10 | 19 | 81 | 8 |
| Example 12 | 99 | 1 | 10 | 20 | 80 | 8 |
| Comparative Example 1 | 99 | 1 | 10 | 5 | 95 | 10 |
| Comparative Example 2 | 99 | 1 | 10 | 10 | 90 | 10 |
| Comparative Example 3 | 99 | 1 | 10 | 15 | 85 | 8 |
| Example 13 | 99 | 1 | 10 | 8 | 92 | 10 |
| Example 14 | 99 | 1 | 10 | 9 | 91 | 10 |
| Example 15 | 89 | 11 | 9 | 5 | 95 | 10 |

TABLE 4

| | Manufacturability | Ability of maintaining visibility | | Total point of all evaluations | Comprehensive evaluation |
|---|---|---|---|---|---|
| | | Ratio of maintaining visibility (%) | Point | | |
| Example 1 | 5 | 96 | 10 | 53 | B |
| Example 2 | 10 | 97 | 10 | 59 | A |
| Example 3 | 5 | 95 | 10 | 51 | C |
| Example 4 | 5 | 90 | 10 | 51 | C |
| Example 5 | 2 | 92 | 10 | 48 | D |
| Example 6 | 2 | 99 | 10 | 48 | D |
| Example 7 | 2 | 96 | 10 | 46 | E |
| Example 8 | 2 | 96 | 10 | 46 | E |
| Example 9 | 2 | 99 | 10 | 45 | F |
| Example 10 | 0 | 100 | 10 | 44 | G |
| Example 11 | 0 | 100 | 10 | 44 | G |
| Example 12 | 0 | 100 | 10 | 44 | G |
| Comparative Example 1 | 5 | 32 | 0 | 43 | H |
| Comparative Example 2 | 5 | 29 | 0 | 41 | H |
| Comparative Example 3 | 2 | 24 | 0 | 36 | H |
| Example 13 | 10 | 99 | 10 | 58 | B |
| Example 14 | 10 | 99 | 10 | 56 | B |
| Example 15 | 10 | 99 | 10 | 55 | B |

Aspects of the present disclosure are as follows, for example.

<1> A multilayer film, wherein a reflectance of the multilayer film in a visible light region and a reflectance of the multilayer film in a near infrared region are both 0.1% or more but 20% or less in a temperature range of 5° C. or more but less than 30° C., and the reflectance of the multilayer film in the visible light region is 0.1% or more but 20% or less and the reflectance of the multilayer film in the near infrared region is 80% or more but less than 100% in a temperature range of 30° C. or more but less than 60° C.

<2> The multilayer film according to <1>,
wherein the multilayer film includes one or more first layers and one or more second layers, and the one or more first layers have an average thickness of 50 nm or more but 300 nm or less and the one or more second layers have an average thickness of 50 nm or more but 200 nm or less, and wherein the multilayer film satisfies Expression 1 below:

$$-0.010 \leq (R_B - R_A) \leq 0.010$$

$$0.010 \leq (R_D - R_C) \leq 0.20 \qquad \text{[Expression 1]}$$

where the $R_A$ is a minimum refractive index of a material constituting the one or more first layers at 5° C. or more but less than 30° C., the $R_B$ is a minimum refractive index of a material constituting the one or more second layers at 5° C. or more but less than 30° C., the $R_C$ is a maximum refractive index of the material constituting the one or more first layers at 30° C. or more but less than 60° C., and the $R_D$ is a maximum refractive index of the material constituting the one or more second layers at 30° C. or more but less than 60° C.

<3> The multilayer film according to <2>,
wherein the multilayer film includes two or more kinds of alternately laminated bodies, each of the two or more kinds of alternately laminated bodies including the one or more first layers and the one or more second layers, and wherein a number of the one or more first layers constituting each of the two or more kinds of alternately laminated bodies is 50 layers or more and a number of the one or more second layers constituting each of the two or more kinds of alternately laminated bodies is 50 layers or more.

<4> The multilayer film according to <3>,
wherein the multilayer film includes an alternately laminated body A, an alternately laminated body B, an alternately laminated body C, and an alternately laminated body D, which are presented in Table A below:

TABLE A

| Configuration of multilayer film | | Alternately laminated body A | Alternately laminated body B | Alternately laminated body C | Alternately laminated body D |
|---|---|---|---|---|---|
| First layers | Average thickness | 100 nm or more but 200 nm or less | 100 nm or more but 200 nm or less | 100 nm or more but 200 nm or less | 100 nm or more but 200 nm or less |
| | Number of first layers | 50 layers or more but 300 layers or less | 50 layers or more but 300 layers or less | 50 layers or more but 300 layers or less | 50 layers or more but 300 layers or less |
| Second layers | Average thickness | 100 nm or more but 200 nm or less | 100 nm or more but 200 nm or less | 100 nm or more but 200 nm or less | 100 nm or more but 200 nm or less |
| | Number of second layers | 50 layers or more but 300 layers or less | 50 layers or more but 300 layers or less | 50 layers or more but 300 layers or less | 50 layers or more but 300 layers or less |

<5> The multilayer film according to any one of <2> to <4>,
wherein a ratio of the average thickness of each of the second layers to the average thickness of each of the first layers is 1.5 times or more but 5.0 times or less.

<6> The multilayer film according to any one of <2> to <5>,
wherein the material constituting the one or more first layers includes a poly(meth)acrylic ester or a derivative of the poly(meth)acrylic ester.

<7> The multilayer film according to any one of <2> to <6>,
wherein the material constituting the one or more second layers includes poly(N-isopropylacrylamide) (PNIPAM).

<8> The multilayer film according to any one of <3> to <7>,
wherein the multilayer film includes 2 or more but 4 or less kinds of alternately laminated bodies.

<9> A multilayer film composite including:
a base material; and
the multilayer film according to any one of <1> to <8> on the base material.

<10> The multilayer film composite according to <9>,
wherein the base material includes at least one selected from a polyester resin, a polycarbonate resin, an epoxy resin, an acrylic resin, an ABS resin, and a silicate salt.

<11> An optical component including
the multilayer film according to any one of <1> to <8> or the multilayer film composite according to <9> or <10>.

<12> A window including
the multilayer film according to any one of <1> to <8> or the multilayer film composite according to <9> or <10>.

The multilayer film according to any one of <1> to <8>, the multilayer film composite according to <9> or <10>, the optical component according to <11>, and the window according to <12> can solve the existing problems and can achieve the object of the present disclosure.

What is claimed is:

1. A multilayer film, comprising:
one or more first layers comprising a thermoplastic resin; and
one or more second layers comprising a polymer,
wherein a reflectance of the multilayer film in a visible light region and a reflectance of the multilayer film in a near infrared region are both 0.1% or more but 20% or less in a temperature range of 5° C. or more but less than 30° C., and the reflectance of the multilayer film in the visible light region is 0.1% or more but 20% or less and the reflectance of the multilayer film in the near infrared region is 80% or more but less than 100% in a temperature range of 30° C. or more but less than 60° C.,
wherein the multilayer film satisfies Expression 1 below:

$$-0.010 \leq (R_B - R_A) \leq 0.010$$

$$0.010 \leq (R_D - R_C) \leq 0.20 \qquad \text{[Expression 1]}$$

where the $R_A$ is a minimum refractive index of a material constituting the one or more first layers at 5° C. or more but less than 30° C., the $R_B$ is a minimum refractive index of a material constituting the one or more second layers at 5° C. or more but less than 30° C., the $R_C$ is a maximum refractive index of the material constituting the one or more first layers at 30° C. or more but less than 60° C., and the $R_D$ is a maximum refractive index of the material constituting the one or more second layers at 30° C. or more but less than 60° C., wherein the multilayer film comprises an alternately laminated body A, an alternately laminated body B, an alternately laminated body C, and an alternately laminated body D, which are presented in Table A below:

TABLE A

| Configuration of multilayer film | | Alternately laminated body A | Alternately laminated body B |
|---|---|---|---|
| First layers | Average thickness | 100 nm or more but 200 nm or less | 100 nm or more but 200 nm or less |
| | Number of first layers | 50 layers or more but 300 layers or less | 50 layers or more but 300 layers or less |
| Second layers | Average thickness | 100 nm or more but 200 nm or less | 100 nm or more but 200 nm or less |
| | Number of second layers | 50 layers or more but 300 layers or less | 50 layers or more but 300 layers or less |
| Configuration of multilayer film | | Alternately laminated body C | Alternately laminated body D |
| First layers | Average thickness | 100 nm or more but 200 nm or less | 100 nm or more but 200 nm or less |
| | Number of first layers | 50 layers or more but 300 layers or less | 50 layers or more but 300 layers or less |
| Second layers | Average thickness | 100 nm or more but 200 nm or less | 100 nm or more but 200 nm or less |
| | Number of second layers | 50 layers or more but 300 layers or less | 50 layers or more but 300 layers or less. |

2. A window comprising
the multilayer film according to claim 1.

3. The multilayer film according to claim 1, wherein
the thermoplastic resin of the one or more first layers is at least one selected from the group consisting of polyethylene, polypropylene, polyvinyl acetate, polystyrene, polyacrylic acid, polyacrylic ester, polymethacrylic acid, polymethyl methacrylate (PMMA), polyacrylonitrile, polybutadiene, polyamide, polyacetal, polycarbonate, polyphenylene ether, polyethylene terephthalate, polybutylene terephthalate, cyclic polyolefin, polyphenylene sulfide, polytetrafluoroethylene, polysulphone, polyethersulfone, polyarylate, liquid crystal polymers, polyimide, derivatives thereof, copolymers thereof, and alloys thereof, and the polymer comprises a temperature-responsive unit which is at least one selected from the group consisting of azobenzene, diarylethene, a hydroxyl group, a carbonyl group, and an amide bond.

4. The multilayer film according to claim 3, wherein
the thermoplastic resin of the one or more first layers is polymethyl methacrylate (PMMA), and
the polymer of the one or more second layers is poly(N-isopropylacrylamide) (PNIPAM).

5. A multilayer film composite comprising:
a base material; and
a multilayer film on the base material,
wherein the multilayer film comprises one or more first layers comprising a thermoplastic resin, and one or more second layers comprising a polymer,
wherein a reflectance of the multilayer film in a visible light region and a reflectance of the multilayer film in a near infrared region are both 0.1% or more but 20% or less in a temperature range of 5° C. or more but less than 30° C., and the reflectance of the multilayer film in the visible light region is 0.1% or more but 20% or less and the reflectance of the multilayer film in the near infrared region is 80% or more but less than 100% in a temperature range of 30° C. or more but less than 60° C.,
wherein the multilayer film satisfies Expression 1 below:

$$-0.010 \leq (R_B - R_A) \leq 0.010$$

$$0.010 \leq (R_D - R_C) \leq 0.20 \qquad \text{[Expression 1]}$$

where the $R_A$ is a minimum refractive index of a material constituting the one or more first layers at 5° C. or more but less than 30° C., the $R_B$ is a minimum refractive index of a material constituting the one or more second layers at 5° C. or more but less than 30° C., the $R_C$ is a maximum refractive index of the material constituting the one or more first layers at 30° C. or more but less than 60° C., and the $R_D$ is a maximum refractive index of the material constituting the one or more second layers at 30° C. or more but less than 60° C.,
wherein the multilayer film comprises an alternately laminated body A, an alternately laminated body B, an alternately laminated body C, and an alternately laminated body D, which are presented in Table A below:

TABLE A

| Configuration of multilayer film | | Alternately laminated body A | Alternately laminated body B | Alternately laminated body C | Alternately laminated body D |
|---|---|---|---|---|---|
| First layers | Average thickness | 100 nm or more but 200 nm or less | 100 nm or more but 200 nm or less | 100 nm or more but 200 nm or less | 100 nm or more but 200 nm or less |
| | Number of first layers | 50 layers or more but 300 layers or less | 50 layers or more but 300 layers or less | 50 layers or more but 300 layers or less | 50 layers or more but 300 layers or less |
| Second layers | Average thickness | 100 nm or more but 200 nm or less | 100 nm or more but 200 nm or less | 100 nm or more but 200 nm or less | 100 nm or more but 200 nm or less |
| | Number of second layers | 50 layers or more but 300 layers or less | 50 layers or more but 300 layers or less | 50 layers or more but 300 layers or less | 50 layers or more but 300 layers or less. |

6. The multilayer film composite according to claim 5, wherein the base material comprises at least one selected from the group consisting of a polyester resin, a polycarbonate resin, an epoxy resin, an acrylic resin, an ABS resin, and a silicate salt.

7. An optical film comprising
the multilayer film composite according to claim 5.

8. A window comprising
the multilayer film composite according to claim 5.

9. An optical component comprising:
a base material; and
a multilayer film on the base material,
wherein the multilayer film comprises one or more first layers comprising a thermoplastic resin, and one or more second layers comprising a polymer,
wherein a reflectance of the multilayer film in a visible light region and a reflectance of the multilayer film in a near infrared region are both 0.1% or more but 20% or less in a temperature range of 5° C. or more but less than 30° C., and the reflectance of the multilayer film in the visible light region is 0.1% or more but 20% or less and the reflectance of the multilayer film in the near infrared region is 80% or more but less than 100% in a temperature range of 30° C. or more but less than 60° C.,
wherein the multilayer film satisfies Expression 1 below:

$$-0.010 \leq (R_B - R_A) \leq 0.010$$

$$0.010 \leq (R_D - R_C) \leq 0.20 \quad \text{[Expression 1]}$$

where the $R_A$ is a minimum refractive index of a material constituting the one or more first layers at 5° C. or more but less than 30° C., the $R_B$ is a minimum refractive index of a material constituting the one or more second layers at 5° C. or more but less than 30° C., the $R_C$ is a maximum refractive index of the material constituting the one or more first layers at 30° C. or more but less than 60° C., and the $R_D$ is a maximum refractive index of the material constituting the one or more second layers at 30° C. or more but less than 60° C.,
wherein the multilayer film comprises an alternately laminated body A, an alternately laminated body B, an alternately laminated body C, and an alternately laminated body D, which are presented in Table A below:

TABLE A

| Configuration of multilayer film | | Alternately laminated body A | Alternately laminated body B | Alternately laminated body C | Alternately laminated body D |
|---|---|---|---|---|---|
| First layers | Average thickness | 100 nm or more but 200 nm or less | 100 nm or more but 200 nm or less | 100 nm or more but 200 nm or less | 100 nm or more but 200 nm or less |
| | Number of first layers | 50 layers or more but 300 layers or less | 50 layers or more but 300 layers or less | 50 layers or more but 300 layers or less | 50 layers or more but 300 layers or less |
| Second layers | Average thickness | 100 nm or more but 200 nm or less | 100 nm or more but 200 nm or less | 100 nm or more but 200 nm or less | 100 nm or more but 200 nm or less |
| | Number of second layers | 50 layers or more but 300 layers or less | 30 layers or more but 300 layers or less | 50 layers or more but 300 layers or less | 50 layers or more but 300 layers or less. |

* * * * *